United States Patent [19]

Riski

[11] Patent Number: 4,768,596
[45] Date of Patent: Sep. 6, 1988

[54] SOIL CRUST LOOSENING APPARATUS

[75] Inventor: John D. Riski, Minto, N. Dak.

[73] Assignee: Harriston Industries, Inc., Minto, N. Dak.

[21] Appl. No.: 28,738

[22] Filed: Mar. 23, 1987

[51] Int. Cl.⁴ .................... A01B 29/06; A01B 35/28; A01B 39/12
[52] U.S. Cl. .................... 172/545; 172/551; 172/554
[58] Field of Search ............... 172/554, 545, 543, 572, 172/551

[56] References Cited

U.S. PATENT DOCUMENTS

| 897,057 | 8/1908 | Brook | 172/554 |
| 941,091 | 11/1909 | Newland | 172/554 |
| 1,442,251 | 1/1923 | Ciari | 172/184 |
| 1,490,222 | 4/1924 | Martin | 172/551 |
| 1,498,378 | 6/1924 | Irwin | 172/554 |
| 1,639,307 | 8/1927 | Neu | 172/554 |
| 1,950,851 | 3/1934 | Konrad | 172/554 |
| 2,902,099 | 9/1959 | Yafjack | 172/554 |

Primary Examiner—Richard J. Johnson
Attorney, Agent, or Firm—Henderson & Sturm

[57] ABSTRACT

An apparatus for loosening a crust formed in the soil over planted seeds. A drum having a plurality of fingers rotatably disposed around an outer cylindrical surface thereof is biased toward the ground by spring rods which are adjustably attached to a frame. The frame is typically mounted to a prime mover such as a tractor or to a cultivator or the like attached to an agricultural tractor.

9 Claims, 1 Drawing Sheet

SOIL CRUST LOOSENING APPARATUS

TECHNICAL FIELD

The present invention relates generally to soil working equipment for planted crops and more particularly to an apparatus for loosening a crust formed in soil over planted seeds.

BACKGROUND ART

When planting crops, typically a seed bed is formed by loosening the soil with some sort of tillage equipment and then planting the crops so that once they germinate and begin to grow, they can easily pass through the loosened soil and from there they can grow into maturity. It happens from time to time, however, that once the seeds are planted and before they emerge through to top of the soil, that the soil becomes extremely wet, such as from a rain, and then is baked into a hard crust by the sun. If this crust is hard enough, the plants cannot penetrate it and they die or are impeded in their growth so much that they cannot produce at top efficiency in a limited growing cycle.

Often when this crust forms, some of the plants make it through the crust but others do not, resulting in a very poor stand of crops. The farmer then needs to decide whether to reseed the entire area affected, resulting in more expense and a more limited growing season, or to accept the lower yield from having less than a full stand of plants. Another alternative is to pull a harrow or the like over the surface affected to loosen the crust. A major problem with using a harrow or the like to loosen the soil is that such implements tend to tear up and destroy or severely damage the small plants as they go through the soil. Furthermore, these implements tend to carry weeds and plants with them as they pass through the field. So there is a danger that more damage could be done to the small plants and seeds in this process than good from loosening the crust.

Consequently, there is a need for an apparatus for solving the aforementioned problem of loosening the crust formed in the soil over planted seeds without having the major disadvantages referred to above.

DISCLOSURE OF THE INVENTION

The present invention relates to an apparatus for loosening a crust formed in the soil over planted seeds. A drum having a plurality of fingers rotatably disposed around an outer cylindrical surface thereof is biased toward the ground by spring rods and is adjustably attached to a frame which would typically be mounted to a prime mover such as a tractor or to a cultivator or the like attached to an agricultural tractor.

An object of the present invention is to provide an improved apparatus for loosening a crust formed in soil over planted seeds.

A further object of the invention is to provide an apparatus of the aforementioned type which has a plurality of fingers rotatably attached to an external cylindrical surface of a drum wherein the fingers have a curved end thereon to prevent the collection of trash as the device moves through the field.

Another object of the present invention is to provide a device of the aforementioned type which will provide a maximum loosening of the soil crust while at the same time providing a minimum of damage to seeds and plants previously planted thereunder.

Other objects, advantages, and novel features of the present invention will become apparent from the following detailed description of the invention when considered in conjunction with the accompanying drawings.

BEST MODE FOR CARRYING OUT THE INVENTION

Figures 1, 2, 3, 4:
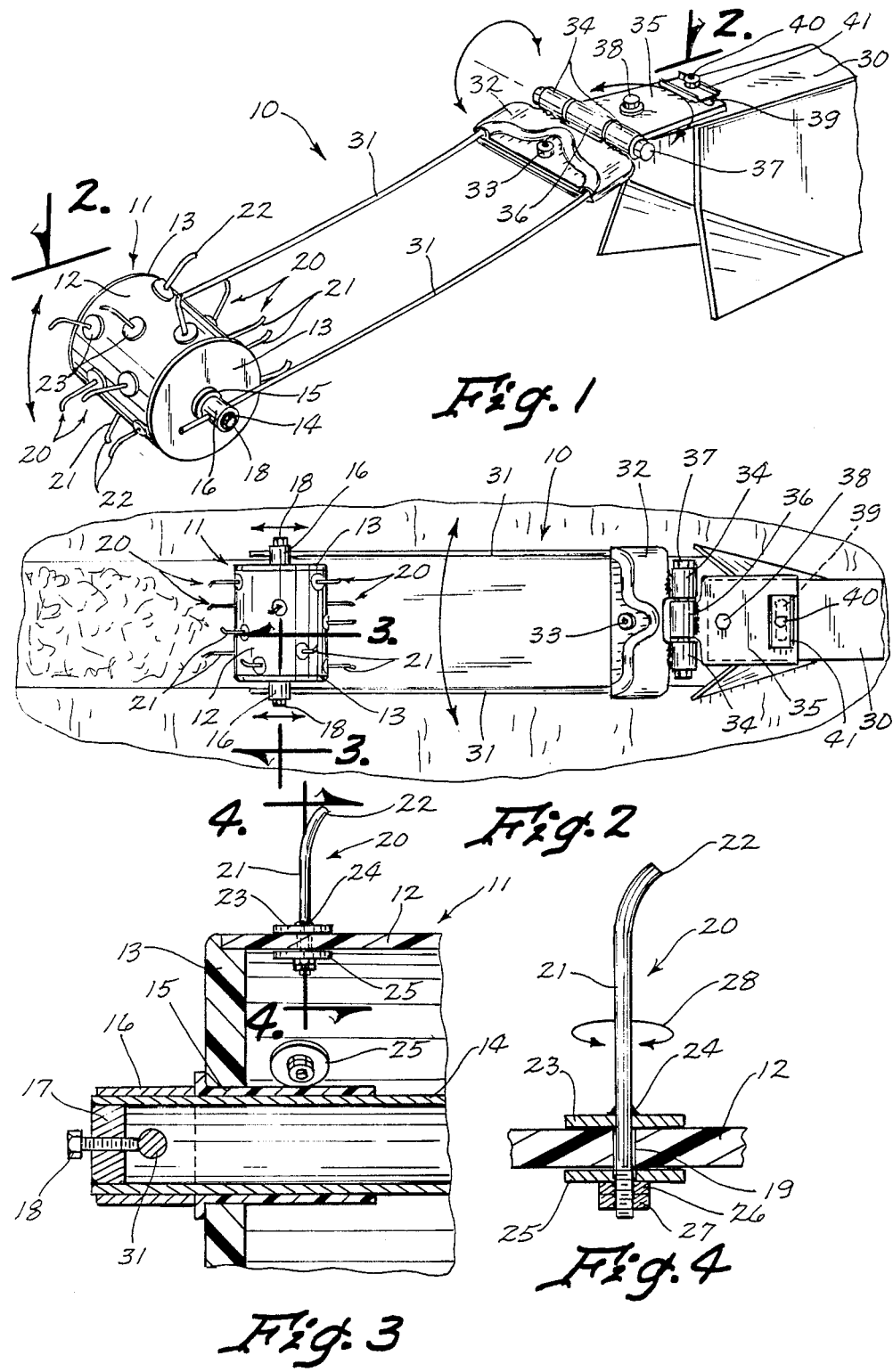
FIG. 1 is a perspective view of a preferred embodiment of the present invention.
FIG. 2 is a top plan view of the preferred embodiment shown in FIG. 1 in use loosening the crust over planted seeds.
FIG. 3 is an enlarged partial cross-sectional view taken along line 3—3 of FIG. 2.
FIG. 4 is an enlarged partial cross-sectional view taken along line 4—4 of FIG. 3.

Referring now to the drawings wherein like reference numerals designate identical or corresponding parts throughout the several views, FIG. 1 shows an apparatus (10) constructed in accordance with the present invention.

The apparatus (10) includes a drum (11) having a cylindrical surface (12) and end caps (13). An axle (14) is rotatably disposed within a bearing (15) and sleeves (16) hold the axle (14) in place as shown in FIGS. 2 and 3. End caps (17) are welded in the ends of the axle (14) and have an internally threaded opening therein for receiving a set bolt (18) as is shown in FIG. 3.

Fingers (20) include a shaft (21) having a longitudinal axis and a curved portion (22) at one end thereof that is curved at about 60° with respect to the longitudinal axis of the shaft (21). A washer (23) is attached by a weld (24) to the finger (20). Finger (20) extends through openings (19) and a washer (25) and nuts (26) and (27) hold the washer (25) somewhat loosely so that the finger (20) can rotate freely about the longitudinal axis of the straight shaft (21) in the direction of the arrow (28).

A plant shield (30) is attached to a prime mover (not shown) or to a cultivator or the like, also not shown. A pair of spring rods (31) extend through openings in sleeves (16) and in the ends of the axle (14) as can readily be seen in FIGS. 1 and 3. The axle (14) is held in place with respect to the rods (31) by the set bolt (18) which engages the rods (31) as is shown in FIG. 3. The other end of the rods (31) are attached to a first bracket (32) which is formed in two halves and is clamped together by threaded nut and bolt fastener (33). First bracket (32) has a pair of cylindrical hinge members (34) welded thereto.

A second bracket (35) has a hinge member (36) welded thereto which fits between the hinge members (34) of the first bracket (32). A nut and bolt fastener (37) is provided for allowing pivoting of the first plate (32) with respect to the second plate (35) when the threaded fastener (37) is loose and when the threaded fastener (37) is tightened down to pull the hinge members (34) tightly against the hinge member (36), this adjusts the angle of the spring rods (31) with respect to the ground and holds them securely in that position.

The bracket (31) is pivotally attached to the frame (30) by threaded fastener (38) and this arrangement is useful to align the drum (11) precisely where it is needed behind the frame (30). Once it is so adjusted, threaded fastener (40), which extends through a slot (39) in the second bracket (35) and through another member (41), can be tightened down to frictionally hold the second bracket (35) from pivoting with respect to the frame (30).

In operation, the apparatus (10) shown in FIG. 1 would first be adjusted by loosening the nut and bolt fastener (40) and aligning the drum (11) so that it follows at the desired place behind the frame or guard (30). The other adjustment that needs to be made is to provide the proper downward tension on the drum (11) by loosening the threaded fastener (37) and obtaining the proper angle between the spring arms (31) and the ground. Once this proper relationship has been achieved, then threaded fastener (37) is tightened down to hold the arms (31) in that adjusted position. After these adjustments have been made, then the apparatus (10) would be pulled through a field of growing crops, for example row crops such as corn or soybeans, and the drum (11) will rotate over the top of the soil with the seeds thereunder as shown in FIG. 2. The fingers (20) will enter the soil and break the crust, but because they can pivot and because they have curved ends (22) thereon, they will tend to do a minimum amount of damage to the seeds or plants in the row.

Accordingly, it will be appreciated that the preferred embodiment (10) does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. Apparatus for loosening a crust formed in soil over planted seeds, said apparatus comprising:
   a frame adapted to be moved along above the soil in a first direction;
   a drum having an outer cylindrical surface and drum being adapted to roll along above the soil about a rotational axis;
   a plurality of fingers having a longitudinal axis and being bent to one side on one end thereof;
   connection means for rotatably attaching the other end of said fingers to the outer cylindrical surface of said drum along the longitudinal axis thereof; and
   arm means attached to said frame and to said drum for causing said fingers to be positioned to enter the soil as the drum is moved along in said first direction.

2. The apparatus of claim 1 wherein the longitudinal axes of said fingers passes through the rotational axis of said drum.

3. The apparatus of claim 1 wherein the axis of rotation of said drum is perpendicular to said first direction movement of said frame.

4. The apparatus of claim 1 including:
   an axle extending through said drum;
   a first bracket; and
   a pair of spring rods attached at one end thereof to each end of the axle respectively, said pair of spring rods being attached to said first bracket at the other end thereof.

5. The apparatus of claim 4 including adjusting means connected to said frame for selectively adjusting the amount of downward pressure on said drum from said frame.

6. The apparatus of claim 4 including an adjusting means connected to said first bracket, said adjusting means including a second bracket connected to said frame and hinge means pivotally connecting the first and the second brackets together along a horizontal axis.

7. The apparatus of claim 6 including a threaded bolt extending through said hinge means and a threaded nut adapted to be threadably engaged on one end of said bolt for holding said hinge means from pivoting once the angle of the spring rods is adjusted at the desired angle with respect to the frame.

8. The apparatus of claim 7 including means for operatively pivotally attaching said second bracket to said frame along a vertical axis.

9. The apparatus of claim 8 including means for locking the second bracket from rotation about said vertical axis whereby the position of the drum with respect to the vertical axis in the frame can be adjusted.

* * * * *